(12) United States Patent
Kowalski et al.

(10) Patent No.: US 9,318,879 B2
(45) Date of Patent: Apr. 19, 2016

(54) SPARK PLUG HAVING FIRING PAD

(71) Applicant: FEDERAL-MOGUL IGNITION COMPANY, Southfield, MI (US)

(72) Inventors: Kevin J. Kowalski, Perrysburg, OH (US); Frederick J. Quitmeyer, Rochester Hills, MI (US); Nathan A. Thomson, Southgate, MI (US); Curtis W. Verhoff, Canton, MI (US); Richard L. Keller, Whitehouse, OH (US)

(73) Assignee: Federal-Mogul Ignition Company, Southfield, MI (US)

( * ) Notice: Subject to any disclaimer, the term of this patent is extended or adjusted under 35 U.S.C. 154(b) by 34 days.

(21) Appl. No.: 14/056,536

(22) Filed: Oct. 17, 2013

(65) Prior Publication Data
US 2014/0111078 A1    Apr. 24, 2014

Related U.S. Application Data

(60) Provisional application No. 61/716,250, filed on Oct. 19, 2012, provisional application No. 61/759,088, filed on Jan. 31, 2013.

(51) Int. Cl.
*H01T 13/39* (2006.01)
*H01T 13/20* (2006.01)
*B23K 26/36* (2014.01)

(52) U.S. Cl.
CPC .............. *H01T 13/20* (2013.01); *B23K 26/362* (2013.01); *H01T 13/39* (2013.01)

(58) Field of Classification Search
CPC ....... B23K 26/206; B23K 26/22; H01T 13/32
USPC .................................................. 313/118–145
See application file for complete search history.

(56) References Cited

U.S. PATENT DOCUMENTS

| | | | |
|---|---|---|---|
| 5,797,383 A | 8/1998 | Matsubara et al. | |
| 5,990,602 A | 11/1999 | Katho et al. | |
| 6,307,307 B1 * | 10/2001 | Kanao | 313/142 |
| 6,337,533 B1 * | 1/2002 | Hanashi et al. | 313/141 |
| 6,523,515 B2 | 2/2003 | Kanao | |
| 6,642,638 B2 | 11/2003 | Ishiguro | |
| 6,676,468 B2 | 1/2004 | Ishiguro et al. | |
| 6,707,237 B2 | 3/2004 | Teramura et al. | |
| 6,853,116 B2 | 2/2005 | Hori et al. | |
| 6,864,623 B2 | 3/2005 | Ishikawa | |
| 6,923,699 B2 | 8/2005 | Matsubara et al. | |
| 7,557,495 B2 | 7/2009 | Tinwell | |
| 7,615,915 B2 | 11/2009 | Ito et al. | |
| 7,804,232 B2 | 9/2010 | Kumagai et al. | |
| 7,973,459 B2 | 7/2011 | Tinwell | |
| 8,106,572 B2 | 1/2012 | Tanaka et al. | |
| 8,106,573 B2 | 1/2012 | Boehler et al. | |
| 8,115,372 B2 | 2/2012 | Kameda | |
| 8,203,258 B2 | 6/2012 | Kameda et al. | |
| 8,212,462 B2 | 7/2012 | Kato | |

(Continued)

*Primary Examiner* — Nimeshkumar Patel
*Assistant Examiner* — Christopher Raabe
(74) *Attorney, Agent, or Firm* — Reising Ethington, P.C.

(57) ABSTRACT

A spark plug has a firing pad attached to a center electrode or a ground electrode by way of a fused portion. In one or more embodiments, the firing pad is composed of a precious metal material. The fused portion can be formed in such a way that a material composition thereof at a sparking surface of the firing pad has a greater percentage of the precious metal material than a material of the underlying electrode to which the firing pad is attached.

20 Claims, 2 Drawing Sheets

(56) References Cited

U.S. PATENT DOCUMENTS

| | | |
|---|---|---|
| 8,212,463 B2 | 7/2012 | Sakayanagi et al. |
| 2002/0003389 A1* | 1/2002 | Ishiguro ........................ 313/141 |
| 2002/0105254 A1* | 8/2002 | Hori et al. ..................... 313/141 |
| 2004/0189169 A1* | 9/2004 | Taniguchi et al. ............. 313/141 |
| 2006/0196650 A1* | 9/2006 | Filippi et al. .................. 165/170 |
| 2010/0084391 A1 | 4/2010 | Nakayama et al. |
| 2010/0109502 A1 | 5/2010 | Nakayama et al. |
| 2010/0247992 A1* | 9/2010 | Miyata et al. ................... 429/94 |
| 2011/0133625 A1 | 6/2011 | Sakayanagi |
| 2011/0198981 A1 | 8/2011 | Kishimoto et al. |
| 2012/0025690 A1 | 2/2012 | Kohl |
| 2012/0025691 A1* | 2/2012 | Sakayanagi et al. .......... 313/141 |
| 2012/0086326 A1 | 4/2012 | Niessner et al. |
| 2014/0042892 A1* | 2/2014 | Kowalski et al. ............. 313/141 |
| 2014/0210334 A1* | 7/2014 | Kowalski et al. ............. 313/141 |
| 2014/0265815 A1* | 9/2014 | Quitmeyer .................... 313/141 |

* cited by examiner

SPARK PLUG HAVING FIRING PAD

REFERENCE TO RELATED APPLICATIONS

This application claims the benefit of U.S. Provisional Ser. Nos. 61/716,250 filed on Oct. 19, 2012, and 61/759,088 filed on Jan. 31, 2013, the entire contents of which are incorporated herein.

TECHNICAL FIELD

This invention generally relates to spark plugs and other ignition devices for internal combustion engines and, in particular, to a firing pad that is welded to an electrode.

BACKGROUND

Spark plugs can be used to initiate combustion in internal combustion engines. Spark plugs typically ignite a gas, such as an air/fuel mixture, in an engine cylinder or combustion chamber by producing a spark across a spark gap defined between two or more electrodes. Ignition of the gas by the spark causes a combustion reaction in the engine cylinder that is responsible for the power stroke of the engine. The high temperatures, high electrical voltages, rapid repetition of combustion reactions, and the presence of corrosive materials in the combustion gases can create a harsh environment in which the spark plug functions. This harsh environment can contribute to erosion and corrosion of the electrodes that can negatively affect the performance of the spark plug over time, potentially leading to a misfire or some other undesirable condition.

To reduce erosion and corrosion of the spark plug electrodes, various types of noble metals and their alloys—such as those made from platinum and iridium—have been used. These materials, however, can be costly. Thus, spark plug manufacturers sometimes attempt to minimize the amount of precious metals used with an electrode by using such materials only at a firing tip of the electrodes where a spark jumps across a spark gap.

SUMMARY

According to one embodiment, a spark plug may include a metallic shell, an insulator, a center electrode, a ground electrode, and a firing pad. The metallic shell has an axial bore. The insulator has an axial bore and is disposed partially or more within the axial bore of the metallic shell. The center electrode is disposed partially or more within the axial bore of the insulator. The ground electrode is attached to the metallic shell. The firing pad is made of a precious metal material and is attached to the center electrode or to the ground electrode via a fused portion. The fused portion is located largely inboard of a peripheral edge (P) of the firing pad and penetrates entirely through a thickness ($T_2$) of the firing pad and through a surface-to-surface interface (S) between the firing pad and the electrode to which the firing pad is attached. And the fused portion includes a sparking surface made from solidified precious metal material formed in a temporary cavity created by vaporization from impingement of a laser beam on the firing pad.

According to another embodiment, a spark plug may include a metallic shell, an insulator, a center electrode, a ground electrode, and a firing pad. The metallic shell has an axial bore. The insulator has an axial bore and is disposed partially or more within the axial bore of the metallic shell. The center electrode is disposed partially or more within the axial bore of the insulator. The ground electrode is attached to the metallic shell. The firing pad is attached to the center electrode or to the ground electrode by way of a keyhole weld. The keyhole weld includes a solidified precious metal section and a solidified mixture section. The solidified precious metal section is located at least at a sparking surface of the firing pad and is comprised of precious metal material of the firing pad that, amid its formation, was driven from an adjacent sparking surface into a temporary cavity created by vaporization via impingement of a laser beam. And the solidified mixture section is located at least below a surface-to-surface interface (S) between the firing pad and the electrode to which the firing pad is attached. The mixture section is comprised of precious metal material of the firing pad and material of the electrode mixed together via impingement of the laser beam.

According to yet another embodiment, a spark plug electrode assembly may include an electrode and a thin firing pad. The thin firing pad is made of a precious metal material and is attached to the electrode via a fused portion. The thin firing pad has a greatest width dimension (W) at least several times greater than a greatest thickness dimension ($T_2$) of the thin firing pad. A material composition of the fused portion at a sparking surface of the thin firing pad includes a greater percentage of the precious metal material than a material of the electrode. And the fused portion extends into the electrode to a depth ($D_2$) taken from a surface-to-surface interface (S) between the thin firing pad and the electrode that is greater than a thickness dimension ($T_2$) of the thin firing pad.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

The firing pads and fused portions described herein can be used in spark plugs and other ignition devices including industrial plugs, aviation igniters, or any other device that is used to ignite an air/fuel mixture in an engine. This includes spark plugs used in automotive internal combustion engines, and particularly in engines equipped to provide gasoline direct injection (GDI), engines operating under lean burning strategies, engines operating under fuel efficient strategies, engines operating under reduced emission strategies, or a combination of these. The various firing pads and fused portions may provide improved ignitability, effective pad retention, enlarged surface areas for exchanging sparks across a spark gap, and cost effective solutions for the use of noble metal, to cite some possible improvements. As used herein, the terms axial, radial, and circumferential describe directions with respect to the generally cylindrical shape of the spark plug of FIG. 1 and generally are with reference to a center axis A, unless otherwise specified.

Figure 1:
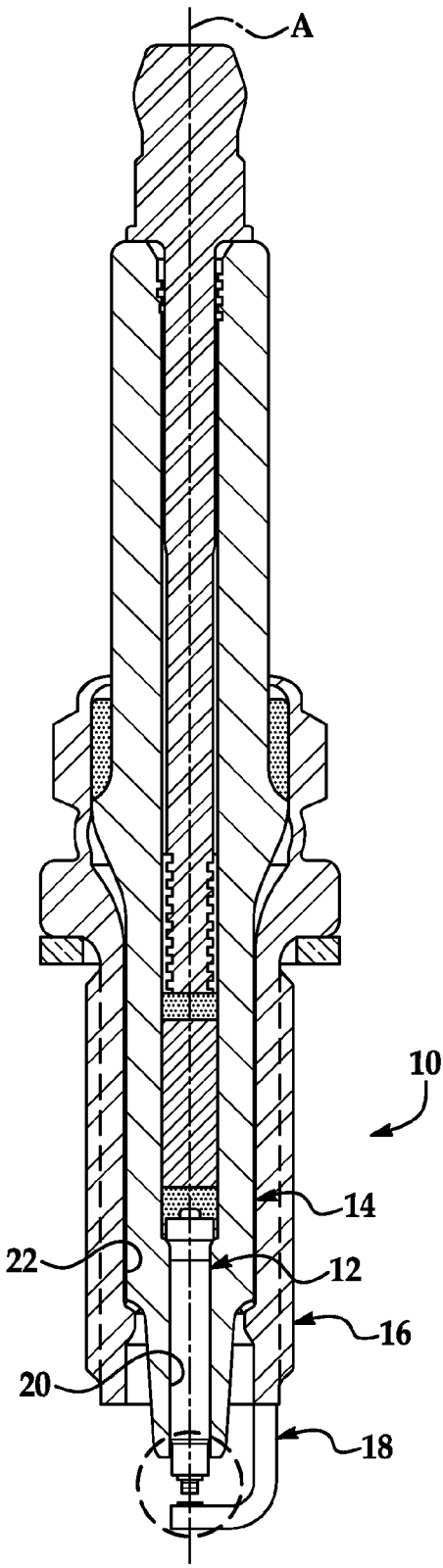
FIG. 1 is a cross-sectional view of an exemplary spark plug.

Referring to FIG. 1, a spark plug 10 includes a center electrode (CE) base or body 12, an insulator 14, a metallic shell 16, and a ground electrode (GE) base or body 18. Other components can include a terminal stud, an internal resistor, various gaskets, and internal seals, all of which are known to those skilled in the art. The CE body 12 is generally disposed within an axial bore 20 of the insulator 14, and has an end portion exposed outside of the insulator at a firing end of the spark plug 10. In one example, the CE body 12 is made of a nickel (Ni) alloy material that serves as an external or cladding portion of the body, and includes a copper (Cu) or Cu alloy material that serves as an internal core of the body; other materials and configurations are possible including a non-cored body of a single material. The insulator 14 is generally disposed within an axial bore 22 of the metallic shell 16, and has an end nose portion exposed outside of the shell at the firing end of the spark plug 10. The insulator 14 is made of a material, such as a ceramic material, that electrically insulates the CE body 12 from the metallic shell 16. The metallic shell 16 provides an outer structure of the spark plug 10, and has threads for installation in the associated engine.

Figure 2:
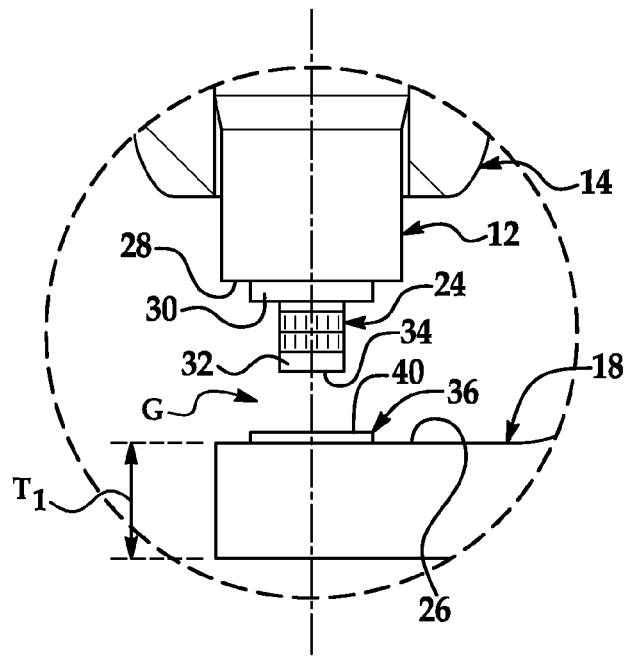
FIG. 2 is an enlarged view of a firing end of the spark plug of FIG. 1, where the firing end includes an exemplary firing pad.

Referring now to FIGS. 1 and 2, the GE body 18 is attached to a free end of the metallic shell 16 and, as a finished product, may have a generally and somewhat conventional L-shape. At an end portion near a spark gap G, the GE body 18 is axially spaced from the CE body 12 and from a CE firing tip 24 (if tip is provided). Like the CE body, the GE body 18 may be made of a Ni alloy material that serves as an external or cladding portion of the body, and can include a Cu or Cu alloy material that serves as an internal core of the body; other examples are possible including non-cored bodies of a single material. Some non-limiting examples of Ni alloy materials that may be used with the CE body 12, GE body 18, or both, include an alloy composed of one or more of Ni, chromium (Cr), iron (Fe), manganese (Mn), silicon (Si), or another element; and more specific examples include Inconel® 600 or 601. Still other materials are possible. In cross-sectional profile, the GE body 18 can have a generally rectangular shape or some other suitable configuration. The GE body 18 has an axially-facing working surface 26 that generally confronts and opposes the CE body 12 or the CE firing tip 24 (if one is provided) across the spark gap G. In a non-limiting example, the GE body 18 has a thickness dimension $T_1$ ranging between approximately 1.14 mm and 1.88 mm; other thickness ranges and values are possible in other examples.

In the embodiment shown in the figures, the spark plug 10 includes an optional CE firing tip 24 that is attached to an axially-facing working surface 28 of the CE body 12 and exchanges sparks across the spark gap G. Referring to FIG. 2, the CE firing tip 24 shown here has a two-piece and generally rivet-like construction and includes a first piece 30 (rivet head) welded to a second piece 32 (rivet stem). The first piece 30 may be directly attached to the CE body 12, and the second piece 32 may be directly attached to the first piece so that an axially-facing sparking surface 34 is provided for exchanging sparks across the spark gap G. The first piece 30 can be made of a Ni-alloy material, and the second piece 32 can be made of a noble metal-alloy material such those including iridium (Ir), platinum (Pt), or ruthenium (Ru); other materials for these pieces are possible. In other embodiments not shown in the drawings, for example, a discrete CE firing tip is omitted, in which case sparks are exchanged from the CE body 12 itself. The optional firing tip 24 could be attached to the GE body 18 instead of the CE body 12, it could have a one-piece or single-material construction, and it could have different shapes including non-rivet-like shapes such as cylinders, bars, columns, wires, balls, mounds, cones, flat pads, rings, or sleeves, to cite several possibilities. The present spark plug is not limited to any particular firing end arrangement, as the firing pads and fused portions described herein could be used with any number of firing end arrangements, including those with or without firing tips 24.

Figure 3:
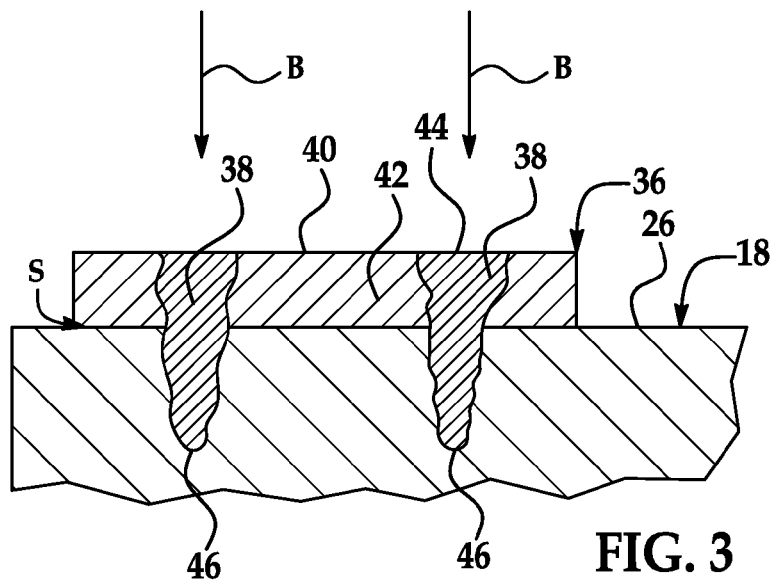
FIG. 3 is an enlarged sectional view of the firing pad of FIG. 2.

Referring now to FIGS. 2 and 3, the spark plug 10 further includes a firing pad 36 made of a precious metal material and attached via welding to the working surface 26 of the GE body 18 for exchanging sparks across the spark gap G. By its attachment, a solidified weldment or fused portion 38 is produced between the firing pad 36 and the GE body 18. While the fused portion 38 can be a mixture of materials of the firing pad 36 and of the GE body 18 at sections along its extent, the fused portion's material near and at a sparking surface 40 of the firing pad mostly, if not completely, contains the precious metal of the firing pad and not the material of the GE body. This means that the fused portion 38 can itself effectively exchange sparks across the spark gap G along with an unfused portion 42 of the firing pad 36 not subject to attachment via welding. In other words, the effective sparking surface area of the firing pad 36 before welding is substantially equal to the effective sparking surface area after welding—very little if any of the area available for sparking is diminished by the welding process. This improves ignitability and maximizes the surface area available for exchanging sparks across the spark gap G compared to previously-known firing tips. The maximized surface area may result in a cost savings, particularly considering the relatively high cost of precious metal materials.

In one previously-known precious metal firing tip, a so-called seam weld is performed in which a laser beam is emitted directly at and directly strikes a periphery of the firing tip at an interfacial boundary between the firing tip and the underlying electrode body. The resulting solidified weld pool at the seam is diluted with more electrode body material and less precious metal material, compared to the fused portion 38. One reason for this is that the laser weld beam in the seam weld directly strikes the underlying electrode body, in addition to the firing tip. Another reason for this may be that the laser weld beam possesses a concentration and energy density that merely melts and mixes the materials subject to its application, as opposed to vaporizing the materials as described below. The dilution hinders sparking performance at the weld pool, and in some cases reduces the effective sparking surface area available for sparking after the welding process. The welding process described herein that produces the fused portion 38, in contrast, generally reduces or altogether eliminates these types of dilution troubles at the sparking surface 40.

Figure 4:
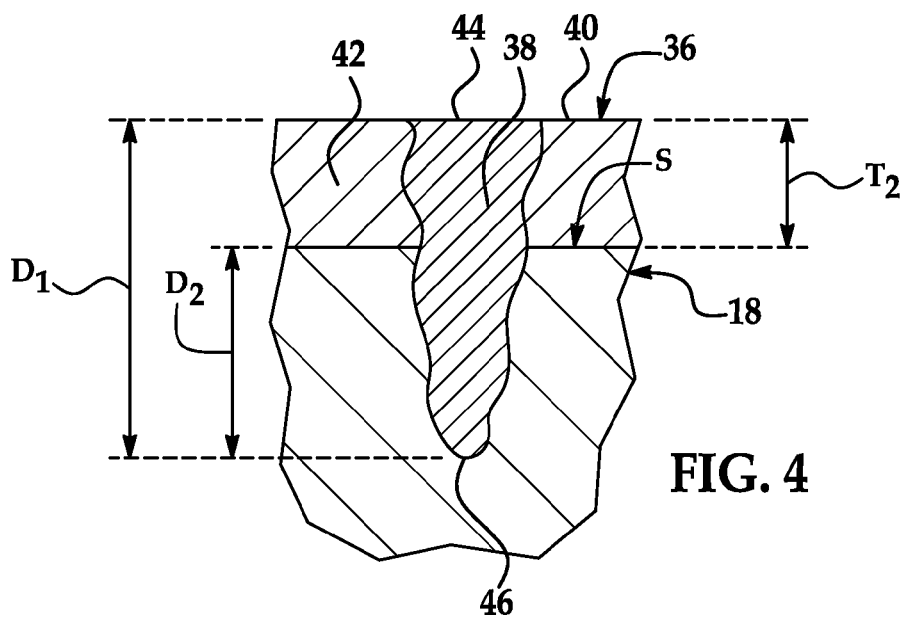
FIG. 4 is an enlarged sectional view of a fused portion of the firing pad of FIG. 2.

Referring to FIGS. 3 and 4, at a first or exposed end 44, the fused portion 38 has a greater amount of precious metal material of the firing pad 36 compared to the amount present at a second or concealed end 46. The amount of precious metal material in the fused portion 38 can be greatest at and near the exposed end 44 and can decrease gradually along the extent of the fused portion from the exposed end to the concealed end 46; conversely, the amount of electrode body material in the fused portion can be greatest at and near the concealed end and can decrease gradually from the concealed end to the exposed end. The amount of precious metal material, however, does not necessarily decrease at a uniform and even rate along its extent, and can instead have greater concentration in the fused portion 38 spanning the thickness of the firing pad 36 and a lesser concentration in the fused portion spanning the GE body 18. In some non-limiting examples, the fused portion 38 is composed of approximately 75% or more of precious metal material and correspondingly approximately 25% or less of electrode body material at the sparking surface 40 and at the exposed end 44; in a different example, the fused portion is composed of approximately 90% to 100% of precious metal material and correspondingly approximately 10% to 0% of electrode body material at the sparking surface and at the exposed end; and in yet another example, the fused portion is composed of approximately 98% of precious metal material and approximately 2% of electrode body material at the sparking surface and at the exposed end. Other ranges of percentages and other percentage values are possible in other examples. It has been found that having precious metal material at the sparking surface 40 and at the exposed end 44 within these amounts provides improved ignitability and maximizes the surface area available for exchanging sparks across the spark gap G.

The fused portion 38 also provides an improved and effective retention between the firing pad 36 and the underlying electrode body; in this embodiment the underlying electrode is the GE body 18. Still referring to FIGS. 3 and 4, the improved retention capabilities are influenced by the depth at which the fused portion 38 penetrates through the entire thickness of the firing pad 36 and into the GE body 18 a given distance past a surface-to-surface interface S. An overall fused portion depth $D_1$ is taken generally orthogonally to the surface-to-surface interface S and between the exposed end 44 and the concealed end 46, and measures the total vertical depth of the fused portion 38 from the sparking surface 40, through the firing pad 36, and into the GE body 18. An electrode body fused portion depth $D_2$, on the other hand, is taken generally orthogonally to the surface-to-surface interface S but begins measurement at the surface-to-surface interface and ends at the concealed end 46. The electrode body fused portion depth $D_2$ measures the vertical depth that the fused portion 38 penetrates into the underlying electrode body, in this case the GE body 18.

In some non-limiting examples, the overall fused portion depth $D_1$ is an approximate 0.5 to 7.5 multiple (x) of a thickness dimension $T_2$ of the firing pad 36 (i.e., $D_1$=0.5$T_2$ to 7.5$T_2$); in another example, $D_1$ is an approximate 2 to 3 multiple (x) of the thickness dimension $T_2$ (i.e., $D_1$=2$T_2$ to 3$T_2$); or, in terms of values, the overall depth fused portion $D_1$ may be approximately 0.25 mm to 0.38 mm. In other non-limiting examples, the electrode body fused portion depth $D_2$ is approximately 10% to 100% of the thickness dimension $T_1$ of the GE body 18 (i.e., $D_2$=0.1$T_1$ to T); or, in terms of values, the electrode body fused portion depth $D_2$ is approximately 0.13 mm to 1.25 mm, or is approximately 0.17 mm to 0.34 mm. Other fused portion depth relationships and other depth ranges and values are possible in other examples, and can be influenced by many factors including the electrode body and firing pad materials used. It has been found that having the overall and electrode body fused portion depths $D_1$, $D_2$ satisfy these relationships, keeping them within these ranges, or both, provides an improved and effective retention between the firing pad 36 and the GE body 18. For instance, an insufficient electrode body fused portion depth $D_2$ could result in premature and unwanted detachment between the firing pad 36 and the GE body 18 during use of the spark plug 10.

Figure 5:
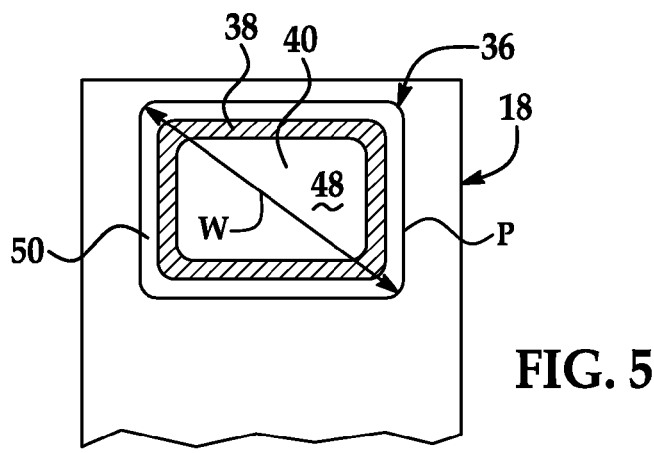
FIG. 5 is an elevation view of the firing pad of FIG. 2 attached to a ground electrode body.

Referring now to FIGS. 3 and 5, the firing pad 36 is provided as a thin pad in the sense that its greatest width dimension W across the sparking surface 40 is usually several times or more larger than its greatest thickness dimension $T_2$ through the firing pad 36. The thin pad is different than many previously-known firing tip configurations with so-called fine wire constructions in which the greatest width dimension across the sparking surface of the wire (i.e., the diameter) is less than the thickness dimension of the wire (i.e., the axial height). Its thinness gives the firing pad 36 a relatively large sparking surface 40 with respect to the total amount of precious metal used, resulting in cost savings, particularly when compared to previously-known fine wire tips. The sparking surface 40 directly confronts and opposes a complementary sparking surface on the CE (with or without discrete firing tip 24), between which sparks are exchanged across the spark gap G during operation of the spark plug 10. In some non-limiting examples, the thickness dimension $T_2$ ranges between approximately 0.05 mm and 0.2 mm; ranges between approximately 0.1 mm and 0.16 mm; or is approximately 0.13 mm. Other thickness ranges and values are possible in other embodiments.

As shown best by FIG. 5, the fused portion 38 is a single continuous weld or molten bond that is located entirely inboard or radially inward of a peripheral edge P, and that generally follows the shape of the peripheral edge P, in this case a square. In other embodiments not shown in the figures, the fused portion need not be located wholly inboard of the peripheral edge P and could instead be made up of discrete individual fused portions (i.e., non-continuous welds); for example, the fused portion could begin and/or end outboard of the peripheral edge P, and could be discrete lines that span entirely across the firing pad 36 and criss-cross one another. And in yet other embodiments, the fused portion can make up the entire sparking surface; that is, the welding process—which could involve laser welding—could be performed over all of the area of the sparking surface so that all of the material at the sparking surface is melted; this embodiment is a possibility due to the greater amount of precious metal material at the sparking surface after welding as a result of the welding processes described herein. In the embodiment of FIG. 5, by its inboard location and continuity, a first or inner unfused portion 48 is defined within the radially-inward confines of the fused portion 38, and a second or outer unfused portion 50 is defined radially-outward of the fused portion and spans to the peripheral edge P. Furthermore, the fused portion 38 provides an improved retention of the firing pad 36 and an improved consistency among welds of manufactured spark plugs, compared to the previously-known seam welds.

The firing pad 36 is preferably made from a noble metal material and can be formed into its thin shape before or after it is welded to the electrode body. The firing pad 36 can be made from a pure precious metal or a precious metal alloy, such as those containing platinum (Pt), iridium (Ir), ruthenium (Ru), or a combination thereof. In some non-limiting examples, the firing pad 36 is made from a Pt alloy containing between approximately 10 wt % and 30 wt % Ni and the balance being Pt, or one containing between approximately 1 wt % and 10 wt % tungsten (W) and the balance being Pt; in either of the preceding Pt-alloy examples, other materials like Ir, Ru, rhodium (Rh), rhenium (Re), or a combination thereof could also be included. Other materials are possible for the firing pad 36, including pure Pt, pure Ir, pure Ru, to name a few. Before being welded to the electrode, the firing pad 36 can be produced by way of various processes and steps including heating, melting, and metalworking. In one example, the firing pad 36 is stamped, cut, or otherwise formed from a thin sheet or tape of precious metal material; in another example, the firing pad is cut or sliced from a wire of precious metal material with a diamond saw or other severing tool, which can then be further flattened or metalworked to refine its shape.

The firing pad 36 can be attached to the underlying electrode body by a number of welding types, techniques, processes, steps, etc. The exact attachment method employed can depend upon, among other considerations, the materials used for the firing pad 36 and those for the electrode body, and the exact shape and size of the firing pad. In one example, the firing pad 36 is preliminarily resistance welded or tack welded to the electrode body for a non-primary and temporary retention against the electrode body. In the resistance welding example, a pair of protrusions or rails may be provided on and may project from a bottom surface of the firing pad 36. The rails can be linear and can span completely across the extent of the bottom surface, though need not. During the resistance welding process, electrical current flow is focused and concentrated through the rails, and hence heat generated at the rails is increased. Subsequently, the firing pad 36 is laser welded to the electrode body for a primary and more permanent retention. In other examples, resistance welding need not be performed, in which case a mechanical clamp or other temporary holding technique could be used to keep the firing pad in place during laser welding. A fiber laser welding type and technique can be performed, as well as other laser welding types and techniques that use Nd:YAG, $CO_2$, diode, disk, and hybrid laser equipment, with or without shielding gas (e.g., argon) in order to protect the weld pool. In the fiber laser example, the fiber laser emits a relatively high concentrated and high energy density beam B (FIG. 3) that can create the fused portion 38 or keyhole weld that rapidly solidifies; other laser beams can also produce a suitably high concentrated and high energy density beam and keyhole weld. The beam B can be a non-pulsed or continuous wave beam, a pulsed beam, or some other type. In one example, the laser weld beam has a repetition rate of 500 Hz, a pulse period of 2 ms, a pulse width of 0.7 ms, a duty cycle of 35%, a welding speed of 25 mm/s, a pulse-to-pulse distance of 0.05 mm, a gas flow rate of 30 SCFH, and a laser power of 70-100 W. In other examples, other parameters are possible for the laser weld beam.

Referring to FIG. 3, amid the welding process the beam B may vaporize, the materials of the firing pad 36 and of the GE body 18 in the area where it directly strikes them, as opposed to merely melting the material. The temporary cavity in the firing pad 36 generated by the thermal energy of the beam B is quickly filled mostly, and in some cases entirely, by the adjacent and immediately surrounding melted precious metal material. The temporary cavity can also reach into the GE body 18, in which case melted precious metal material would be driven physically into the GE body as well. It is currently believed that this is at least one reason why the exposed end 44 is less diluted and maintains a greater amount of precious metal material after welding. This action is facilitated by the beam's increased concentration and energy density, by the beam B striking the firing pad 36 at the sparking surface 40, and by the inboard location of the fused portion 38 where the beam's initial strike is completely surrounded on all sides by precious metal material, as opposed to seam welding along its periphery. That is, the beam's point of entry is at the sparking surface 40, and the thermal energy emitted penetrates entirely through the thickness $T_2$ of the firing pad 36 and penetrates into the GE body 18 vertically below the surface-to-surface interface S. The beam B can be aimed at a generally orthogonal angle relative to the sparking surface 40 as shown in FIG. 3, or can be aimed at another non-orthogonal angle.

In other embodiments not shown in the figures, the firing end and the firing pad 36 could have different designs, constructions, and arrangements. For example, instead of being attached directly to an electrode body, the firing pad 36 could be attached to an intermediate piece which itself could be attached directly to an electrode body, similar to the CE firing tip 24 construction described above. Instead of being welded to the working surface 26 of the GE body 18, the firing pad 36 could be welded directly or indirectly to a distal end surface of the GE body, in which case a radially-directed spark gap would be formed between the firing pad and the CE body 12 or the CE firing tip 24. Still in another example, the firing pad 36 could be attached directly or indirectly to both the GE body 18 and the CE body 12, or could be attached to the CE body alone and not to the GE body. Further, instead of a generally square shape, the firing pad 36 could have a rectangular shape, a circular shape, an oval shape, or an irregular shape. The firing pad 36 could be also be arranged in an angular offset or diamond orientation (e.g., 45°) with respect to the lengthwise extent of the GE body 18, and an end portion of the GE body could be trimmed or narrowed on its sides adjacent the firing pad. These are just some of the designs, constructions, and arrangements possible.

Some thermal testing was conducted in order to observe retention performance between the firing pad 36 and an electrode body. In the testing, the firing pad 36 and electrode body were attached to each other similarly to the embodiment of the figures, with a firing pad of Pt30Ni. In general, the thermal testing subjected the firing pad 36, electrode body, and fused portion 38 to an increased temperature for a relatively brief period of time, and then allowed them to cool to ambient temperature. The testing was meant to simulate expansion and contraction thermal stresses that are more extreme than those experienced in application in a typical internal combustion engine. In the example testing conducted, a sample spark plug was mounted in a collar-like structure made of brass material. The collar structure was secured to the shell of the sample spark plug and did not make direct abutment with the electrode body; the mount structure acted as a heat sink and facilitated cooling. An induction heater was then used to heat the attached firing pad 36 and electrode body up to approximately 1,700° F. for about 20 seconds. After that, the firing pad 36 and electrode body were allowed to cool at rest down to about room temperature or slightly above room temperature. This rise and fall in temperature constituted a single test cycle, and the thermal testing was conducted on numerous sample spark plugs. On average, the sample spark plugs were capable of enduring over one-hundred-and-seventy-five cycles without exhibiting significant cracking, separation, or other conditions that could negatively impact retention between the firing pad 36 and the electrode body. One-hundred-and-seventy-five cycles is considerably greater than the one-hundred-and-twenty-five cycles oftentimes deemed acceptable for such products, and was unexpected in view of how thin the firing pads were. The cycles endured in the testing here is also comparable to pads with much greater thicknesses than the thin firing pads tested—this too was unexpected. It should be appreciated that not all testing will yield these exact results, as different testing parameters, samples, equipment, as well as other factors, can alter the outcome of testing performance.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A spark plug, comprising:
a metallic shell having an axial bore;
an insulator having an axial bore and being disposed at least partially within the axial bore of the metallic shell;
a center electrode being disposed at least partially within the axial bore of the insulator;
a ground electrode being attached to the metallic shell; and
a firing pad of a precious metal material attached to the center electrode or to the ground electrode via a fused portion, wherein the fused portion is located largely inboard of a peripheral edge (P) of the firing pad and penetrates entirely through a thickness ($T_2$) of the firing pad and through a surface-to-surface interface (S) between the firing pad and the electrode to which the firing pad is attached, and the fused portion includes a sparking surface made from solidified precious metal material formed in a temporary cavity created by vaporization from impingement of a laser beam on the firing pad.

2. A spark plug as defined in claim 1, wherein the firing pad is a thin pad that has a greatest width dimension (W) that is at least several times greater than a greatest thickness dimension ($T_2$).

3. A spark plug as defined in claim 1, wherein a majority of the fused portion is located inward of the peripheral edge (P) of the firing pad such that an unfused portion is located outward of the fused portion and extends to the peripheral edge (P).

4. A spark plug as defined in claim 3, wherein a second unfused portion is located inward of the fused portion and is completely bounded by the fused portion.

5. A spark plug as defined in claim 4, wherein the fused portion generally follows the shape of the peripheral edge (P) and is spaced inward from the peripheral edge (P) throughout the extent that it follows the peripheral edge (P).

6. A spark plug as defined in claim 1, wherein the material composition of the fused portion at the sparking surface includes at least approximately 75% of the precious metal material of the firing pad.

7. A spark plug as defined in claim 6, wherein the material composition of the fused portion at the sparking surface includes approximately 90% to 100%, inclusive, of the precious metal material of the firing pad.

8. A spark plug as defined in claim 7, wherein the material composition of the fused portion at the sparking surface includes approximately 100% of the precious metal material of the firing pad.

9. A spark plug as defined in claim 1, wherein a laser beam impinges substantially all of a sparking surface of the firing pad in order to produce the fused portion, and the fused portion thereby constitutes the entire sparking surface of the firing pad from which a spark is exchanged.

10. A spark plug, comprising:
a metallic shell having an axial bore;
an insulator having an axial bore and being disposed at least partially within the axial bore of the metallic shell;
a center electrode being disposed at least partially within the axial bore of the insulator;
a ground electrode being attached to the metallic shell; and
a firing pad attached to the center electrode or to the ground electrode via a keyhole weld including a solidified precious metal section located at least at a sparking surface of the firing pad and comprised of precious metal material of the firing pad that, amid its formation, was driven from an adjacent sparking surface into a temporary cavity created by vaporization via impingement of a laser beam, and the keyhole weld including a solidified mixture section located at least below a surface-to-surface interface (S) between the firing pad and the electrode to which the firing pad is attached, the mixture section comprised of precious metal material of the firing pad and material of the electrode mixed together via impingement of the laser beam.

11. A spark plug as defined in claim 10, wherein the keyhole weld is formed by a fiber laser and penetrates entirely through a thickness ($T_2$) of the firing pad with a weld starting point at the sparking surface of the firing pad.

12. A spark plug as defined in claim 10, wherein a majority of the keyhole weld is located inward of a peripheral edge (P) of the firing pad such that an unfused portion is located outward of the keyhole weld and extends to the peripheral edge (P).

13. A spark plug as defined in claim 12, wherein a second unfused portion is located inward of the keyhole weld and is completely bounded by the keyhole weld.

14. A spark plug as defined in claim 10, wherein the firing pad is a thin pad that has a greatest width dimension (W) that is at least several times greater than a greatest thickness dimension ($T_2$).

15. A spark plug as defined in claim 10, wherein the keyhole weld extends into the electrode to which the firing pad is attached to a depth ($D_2$) taken from the surface-to-surface interface (S) between the firing pad and the electrode that is an approximate 0.5 to 7.5 multiple, inclusive, of a thickness dimension ($T_2$) of the firing pad.

16. A spark plug as defined in claim 15, wherein the depth of the keyhole weld into the electrode is an approximate 2 to 3 multiple, inclusive, of the thickness dimension ($T_2$) of the firing pad.

17. A spark plug as defined in claim 15, wherein the depth of the keyhole weld into the electrode ranges between approximately 0.13 mm and approximately 1.25 mm, inclusive.

18. A spark plug as defined in claim 15, wherein the depth of the keyhole weld into the electrode ranges between approximately 0.17 mm and approximately 0.34 mm.

19. A spark plug electrode assembly, comprising:
an electrode; and
a thin firing pad of a precious metal material attached to the electrode via a fused portion, the thin firing pad having a greatest width dimension (W) across a sparking surface that is at least several times greater than a greatest thickness dimension ($T_2$) of the thin firing pad, wherein a material composition of the fused portion at a sparking surface of the thin firing pad includes a greater percentage of the precious metal material than a material of the electrode, and wherein the fused portion extends into the electrode to a depth ($D_2$) taken from a surface-to-surface interface (S) between the thin firing pad and the electrode that is greater than a thickness dimension ($T_2$) of the thin firing pad.

20. A spark plug electrode assembly as defined in claim 19, wherein the fused portion is a keyhole weld that is formed by a fiber laser and that penetrates entirely through the thickness ($T_2$) of the thin firing pad with a weld starting point at the sparking surface of the thin firing pad.

\* \* \* \* \*